(12) United States Patent
Diab

(10) Patent No.: US 8,116,304 B2
(45) Date of Patent: Feb. 14, 2012

(54) METHOD AND SYSTEM FOR DUTY CYCLING A NETWORK PORT BASED ON DUTY CYCLING OF A LINK COMMUNICATIVELY COUPLED TO THE PORT

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 80 days.

(21) Appl. No.: 12/200,402

(22) Filed: Aug. 28, 2008

(65) Prior Publication Data

US 2009/0154490 A1     Jun. 18, 2009

Related U.S. Application Data

(60) Provisional application No. 61/014,253, filed on Dec. 17, 2007, provisional application No. 61/014,265, filed on Dec. 17, 2007, provisional application No. 61/014,278, filed on Dec. 17, 2007, provisional application No. 61/014,293, filed on Dec. 17, 2007.

(51) Int. Cl.
*H04L 12/28* (2006.01)

(52) U.S. Cl. ......... 370/358; 370/246; 370/250; 370/463

(58) Field of Classification Search .................. 370/229, 370/234, 465, 358, 246, 250, 463
See application file for complete search history.

(56) References Cited

U.S. PATENT DOCUMENTS

| | | | |
|---|---|---|---|
| 5,381,450 A | 1/1995 | Lane | |
| 5,784,559 A * | 7/1998 | Frazier et al. | 370/522 |
| 6,085,248 A | 7/2000 | Sambamurthy et al. | |
| 6,222,852 B1 * | 4/2001 | Gandy | 370/463 |
| 6,269,104 B1 * | 7/2001 | McLaughlin et al. | 370/464 |
| 6,385,208 B1 * | 5/2002 | Findlater et al. | 370/419 |

(Continued)

FOREIGN PATENT DOCUMENTS

EP        1 473 870        11/2004

(Continued)

OTHER PUBLICATIONS

Gupta et al., "Dynamic Ethernet Link Shutdown for Energy Conservation on Ethernet Links." IEEE, Jun. 24, 2007. XP002524616.

(Continued)

*Primary Examiner* — Gary Mui
*Assistant Examiner* — Dewanda Samuel
(74) *Attorney, Agent, or Firm* — Duane S. Kobayashi

(57) ABSTRACT

Aspects of a method and system for duty cycling a network port based on duty cycling of a link communicatively coupled to the port are provided. In this regard, in a network node communicatively coupled to a network link which operates at a plurality of data rates, one or more components of said network node may be cycled through a series of configurations, where a processing capacity and/or a duration of each configuration may be based on the plurality of data rates on the network link. Exemplary components of the node may comprise one or more hybrids, transmitters, receivers, processors, and/or memory elements. The components may be cycled through the series of configurations during each of a series of time intervals. The series of configurations may be based on one or more of a type of data communicated over said network link and an application running on said network node.

24 Claims, 8 Drawing Sheets

U.S. PATENT DOCUMENTS

| | | | |
|---|---|---|---|
| 6,442,174 B1 | 8/2002 | Lin | |
| 6,477,199 B1 * | 11/2002 | Agazzi et al. | 375/232 |
| 6,587,473 B2 | 7/2003 | Terry et al. | |
| 6,618,814 B1 * | 9/2003 | Gaur et al. | 713/323 |
| 6,731,692 B1 | 5/2004 | Bhoja | |
| 6,791,942 B2 * | 9/2004 | Jin | 370/229 |
| 6,795,450 B1 | 9/2004 | Mills et al. | |
| 6,856,597 B1 | 2/2005 | Scott | |
| 6,937,571 B1 * | 8/2005 | Acharya et al. | 370/246 |
| 6,993,667 B1 * | 1/2006 | Lo | 713/320 |
| 7,042,893 B1 * | 5/2006 | Lo et al. | 370/419 |
| 7,050,517 B1 | 5/2006 | Sallaway et al. | |
| 7,149,397 B2 * | 12/2006 | Popovic et al. | 385/134 |
| 7,173,942 B1 * | 2/2007 | Sutardja et al. | 370/463 |
| 7,280,591 B2 * | 10/2007 | Sung | 375/220 |
| 7,292,597 B2 * | 11/2007 | Mills et al. | 370/433 |
| 7,308,058 B2 | 12/2007 | Zerbe et al. | |
| 7,343,425 B1 * | 3/2008 | Lo et al. | 709/246 |
| 7,356,047 B1 * | 4/2008 | Mahalawat et al. | 370/469 |
| 7,466,668 B2 * | 12/2008 | Dove | 370/293 |
| 7,570,657 B1 * | 8/2009 | Lo | 370/465 |
| 7,668,194 B2 * | 2/2010 | Chang et al. | 370/465 |
| 7,680,146 B1 * | 3/2010 | Sutardja et al. | 370/463 |
| 2001/0033611 A1 | 10/2001 | Grimwood | |
| 2002/0123350 A1 * | 9/2002 | Bui | 455/450 |
| 2002/0136231 A1 | 9/2002 | Leatherbury | |
| 2002/0157030 A1 * | 10/2002 | Barker et al. | 713/320 |
| 2003/0053493 A1 | 3/2003 | Mobley | |
| 2003/0191854 A1 * | 10/2003 | Hsu et al. | 709/233 |
| 2005/0117601 A1 * | 6/2005 | Anderson et al. | 370/465 |
| 2006/0034295 A1 | 2/2006 | Cherukuri et al. | |
| 2006/0140218 A1 | 6/2006 | Winterton | |
| 2007/0127581 A1 | 6/2007 | Connor | |
| 2007/0280239 A1 | 12/2007 | Lund | |
| 2008/0201626 A1 | 8/2008 | Sturm | |
| 2008/0225841 A1 | 9/2008 | Conway et al. | |
| 2008/0313508 A1 | 12/2008 | Starr | |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0124233 A1 * | 5/2009 | Morris | 455/406 |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |
| 2009/0180529 A1 | 7/2009 | Agazzi et al. | |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Bennett et al., "Energy Efficient Ethernet", [Online] IEEE 802 Tutorial, Jul. 16, 2007, http://www.ieee802.org/802_tutorials/07-July/IEEE-tutorial-energy-efficient-ethernet.pdf.

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Wael Diab, "Energy Efficient Ethernet and 802.1." Nov. 2007. XP002524617.

\* cited by examiner

US 8,116,304 B2

METHOD AND SYSTEM FOR DUTY CYCLING A NETWORK PORT BASED ON DUTY CYCLING OF A LINK COMMUNICATIVELY COUPLED TO THE PORT

CROSS-REFERENCE TO RELATED APPLICATIONS/INCORPORATION BY REFERENCE

This patent application makes reference to, claims priority to and claims benefit from:
U.S. Provisional Patent Application Ser. No. 61/014,253 filed on Dec. 17, 2007;
U.S. Provisional Patent Application Ser. No. 61/014,265 filed on Dec. 17, 2007;
U.S. Provisional Patent Application Ser. No. 61/014,278 filed on Dec. 17, 2007; and
U.S. Provisional Patent Application Ser. No. 61/014,293 filed on Dec. 17, 2007.

This patent application also makes reference to:
U.S. patent application Ser. No. 12/200,499 filed on even date herewith;
U.S. patent application Ser. No. 12/200,551 filed on even date herewith; and
U.S. patent application Ser. No. 12/200,653 filed on even date herewith;

Each of the above stated applications is hereby incorporated herein by reference in its entirety.

FIELD OF THE INVENTION

Certain embodiments of the invention relate to a method and system for networking. More specifically, certain embodiments of the invention relate to a method and system for duty cycling device resources based on duty cycling of a link communicatively coupled to the device.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for duty cycling a network port based on duty cycling of a link communicatively coupled to the port, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for duty cycling a network port based on duty cycling of a link communicatively coupled to the port. In various embodiments of the invention, in a network node communicatively coupled to a network link which operates at a plurality of data rates, one or more components of the network node may be cycled through a series of configurations. A processing capacity and/or a duration of each of the configurations may be based on the plurality of data rates on the network link. The one or more components may be powered down and/or slowed down in one or more of the configurations. Power consumed by the network node in a first configuration may be less than power consumed by the node in a second configuration. Data processed by the node in a first configuration may be less than data processed by the node in a second configuration. Exemplary components of the node may comprise one or more hybrids, transmitters, receivers, processors, and/or memory elements. The components may be cycled through the series of configurations during each of a series of time intervals. A first series of configurations may be utilized for a portion of the one or more components that are utilized for receiving data and a second series of configurations may be utilized for a portion of the one or more components utilized for transmitting data. The series of configurations may be determined based on one or more of a type of data communicated over the network link and an application running on said network node.

Figure 1:
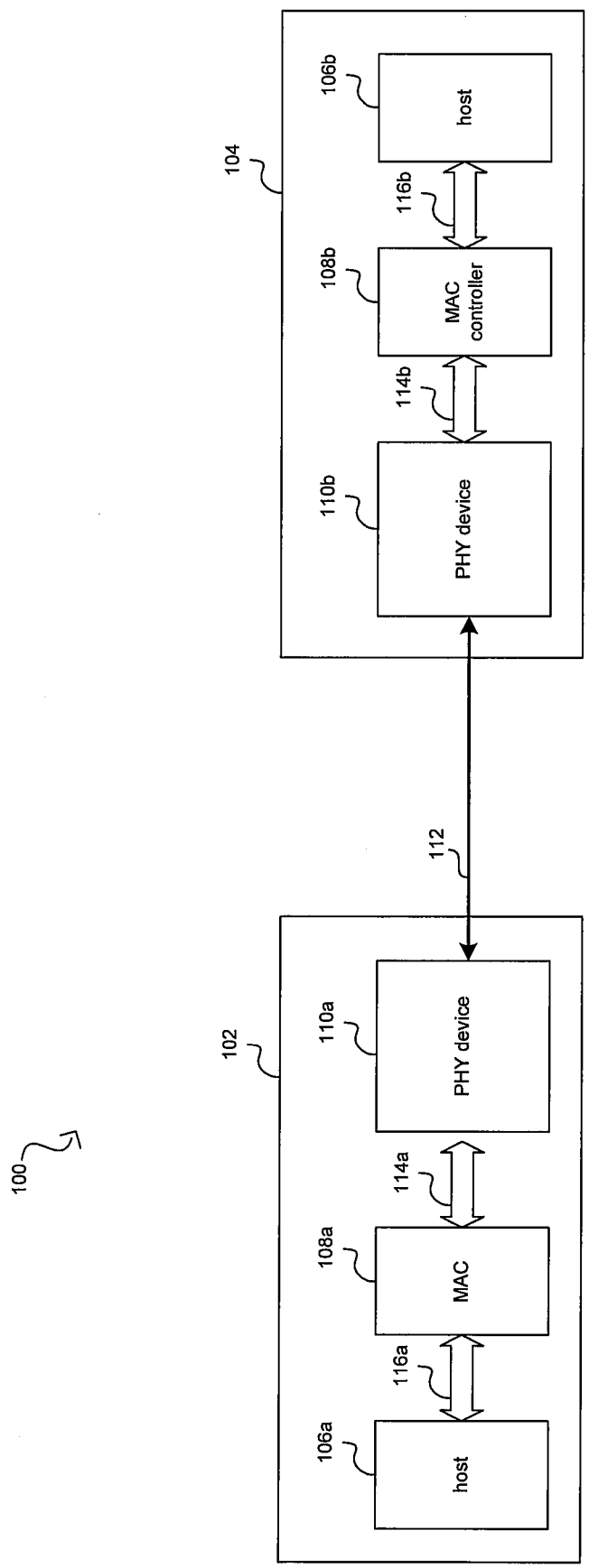
FIG. 1 is a block diagram illustrating an Ethernet connection between two network nodes, in accordance with an embodiment of the invention.

FIG. 1 is a block diagram illustrating an Ethernet connection between two network nodes, in accordance with an embodiment of the invention. Referring to FIG. 1, there is shown a network 100 that comprises network nodes 102 and 104. Notwithstanding the embodiment depicted in FIG. 1, aspects of the invention may be utilized in networks of any size, topology, and/or technology.

The link 112 may comprise up to four or more physical channels, each of which may, for example, comprise an unshielded twisted pair (UTP). The nodes 102 and 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

In an exemplary embodiment of the invention, the nodes 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the nodes 102 and/or 104 may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, the nodes 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the link partners, node 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the link partner nodes 102 and/or 104.

The node 102 may comprise a host 106a, a medium access control (MAC) controller 108a, and a PHY device 104a. The node 104 may comprise a host 106b, a MAC controller 108b, and a PHY device 110b. Notwithstanding, the invention is not limited in this regard. The nodes 102 and 104 may each comprise at least one network port which may enable the nodes 102 and 104 to communicate via the link 112. In this regard, each network port may comprise suitable logic, circuitry, and/or code operable to enable transmission and/or reception of data over a corresponding network link, such as the link 112. In the network nodes 102 and 104, components of one or more network ports may reside in one or more of the host 106, the media access controller 108, and the PHY device 110. Moreover, various components of a network node may be associated with a single port or may be associated with a plurality of ports. Notwithstanding the exemplary embodiment of the invention described with respect to FIG. 1, each of the nodes 102 and 104 may comprise a plurality of ports enabled to communicate over a corresponding plurality of links.

In various embodiments of the invention, the node 102 and/or 104 may comprise, for example, networking devices such as personal computers, wireless local area networking (WLAN) devices, voice over internet protocols (VOIP) devices, handheld devices, servers, switches, routers, and bridges. In various embodiments of the invention, the node 102 and/or 104 may comprise, for example, ANV equipment may such as microphones, instruments, sound boards, sound cards, video cameras, media players, graphics cards, or other audio and/or video devices. Additionally, the nodes 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the node 102 and the node 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the node 102 and the node 104 by utilizing a link discovery signaling (LDS) operation that enables detection of active operations in the other node. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. Accordingly, resources and/or components within the node(s) 102 and/or 104 associated with transmission of data may be duty cycled differently than resources and/or components within the node(s) 102 and/or 104 associated with reception of data.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the node 102. Similarly, the MAC controller 108b may comprise suitable logic, circuitry, and/or code that may enable handling of layer 2 operability and/or functionality in the node 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, the data rate of the link 112 may alternate between a high(er) data rate and a low(er) data rate. Consequently, one or more components in the nodes 102 and 104 which enable communication (e.g., by processing transmitted and/or received data) over the link 112 may be more heavily loaded while the data rate on the link 112 is high(er) and may be more lightly loaded while the data rate on the link 112 is low(er). Accordingly, one or more components in the nodes 102 and 104 which enable communication over the link 112 may be duty cycled in a manner corresponding to the data rate of the link 112. In this regard, one or more components in the nodes 102 and 104 may to be disabled, operated more slowly, or otherwise placed into a low(er) power state during a first portion of a time interval and enabled, operated faster, or otherwise placed into a high(er) power state during a second portion of the time interval. Accordingly, logic, circuitry, and/or code within the nodes 102 and 104 may be duty cycled such that data processing capabilities of the nodes 102 and 104 may match (within a tolerance or range) a data rate of the link 112. For example, a data rate on the link 112 may cycled between a maximum data rate and a zero data rate. Accordingly, the nodes 102 and 104 may cycle between maximum data processing capabilities (i.e. all components powered up and operated at maximum speed) and a "deep sleep" configuration (i.e. a minimum number of components powered up at and clocked at a minimum frequency).

For reliable communications over the link 112, each of the nodes 102 and 104 may need to adjust and/or monitor various parameters and/or circuitry to account for variables such as the type of cabling over which data is being communicated and the environmental conditions (e.g. temperature) surrounding the cabling. This process may be referred to as "training" and may adapt a link partner to current link conditions such that reliable communications may be established on a link. For example, training may comprise configuring various parameters, circuitry, and or timing loops in one or both of the nodes 102 and 104 such that the nodes 102 and 104 may be synchronized and/or reliably communicate over one or more physical channels of the link 112. In this manner, training may ensure reliable operation of functions such as echo cancellation, far-end crosstalk cancellation, and near-end crosstalk cancellation may be performed. Accordingly, when in a "deep sleep" configuration, a minimal amount of logic, circuitry, and/or code in the nodes 102 and 104 may be powered up (enabled) such that a minimal amount of energy or information may be exchanged between the nodes 102 and 104 to prevent a need for re-training upon transitioning back to the maximum rate.

Figure 2:
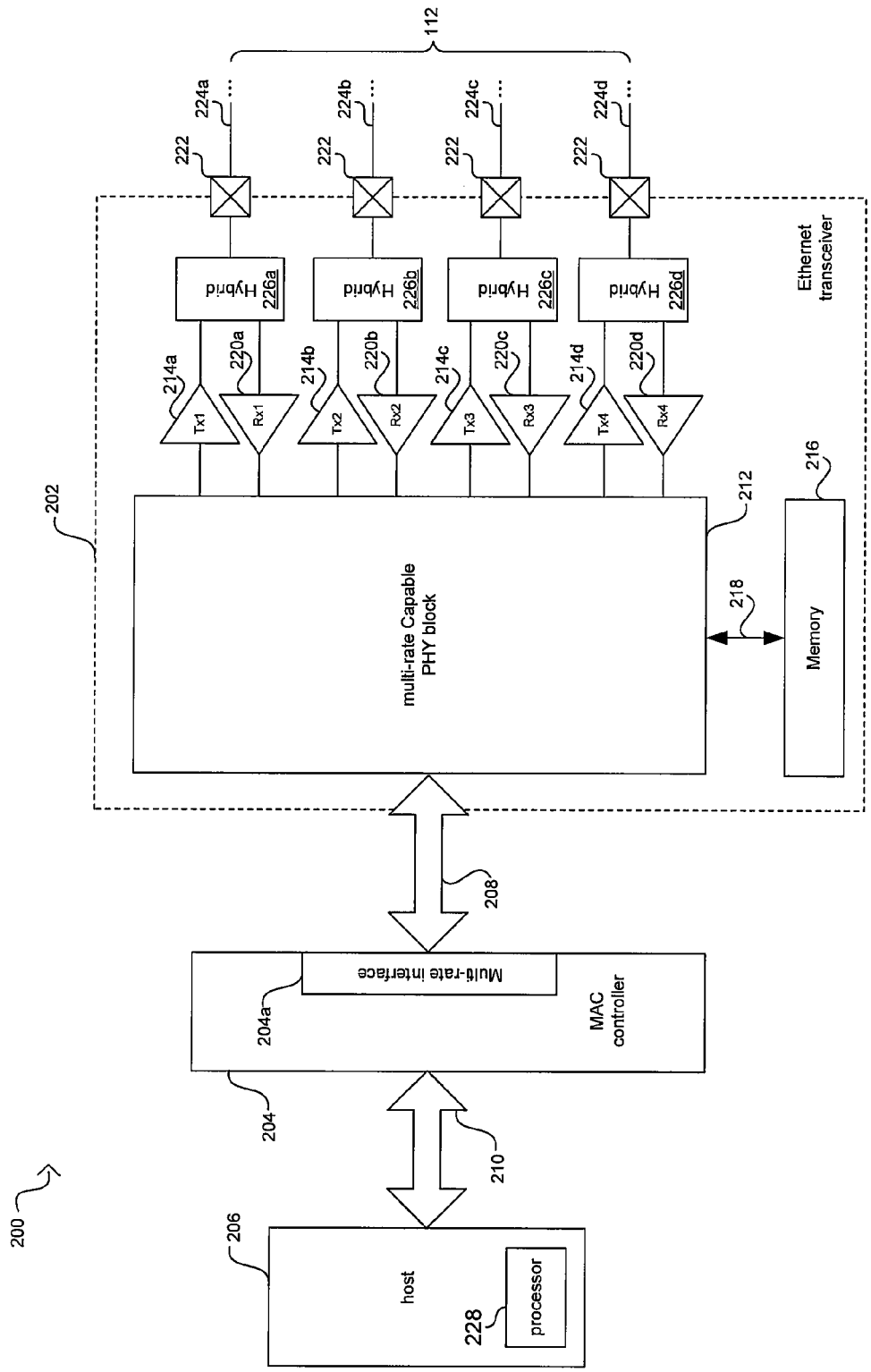
FIG. 2 is a block diagram illustrating an exemplary Ethernet over twisted pair PHY device architecture comprising a multi-rate capable physical layer block, in accordance with an embodiment of the invention.

FIG. 2 is a block diagram illustrating an exemplary Ethernet over twisted pair PHY device architecture comprising a multi-rate capable physical layer block, in accordance with an embodiment of the invention. Referring to FIG. 2, there is shown a network node 200 which may comprise an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that may enable communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network node. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between network nodes. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the node 200 to a remote node via, for example, the link 112 in FIG. 1. The receivers 220a, 220b, 220c, 220d may comprise suitable logic, circuitry, and/or code that may enable receiving data from a remote node. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair.

The PHY device 202 may be enabled to transmit and receive simultaneously over up to four or more physical links. Accordingly, the node 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the node 300 may be communicatively coupled to an input/output interface 222.

In operation, one or more components in the PHY block 202, the MAC controller 204, and/or the host 206 may be cycled between a plurality of power configurations in response to a duty cycling of the data rate on the link 112. For example, one or more processors/controllers such as the processor 228, memory elements such as the memory 216, transmitters such as the transmitters 214, and/or receivers such as the receivers 220, in the PHY block 202, the MAC controller 204, and/or the host 206 may be disabled or slowed down (e.g., clocked at a lower frequency) when the node 200 is in a low(er) power state and may be enabled or sped up (e.g., clocked at a higher frequency) when the node 200 is in a high(er) power state. Components and/or resources cycled between a series of configurations may be associated with the physical layer and higher layers of the OSI model. In various embodiments of the invention, one or more processors/controllers, such as the processor 228, may be a bus controller (e.g. PCI, PCI express, USB).

Figure 3A:
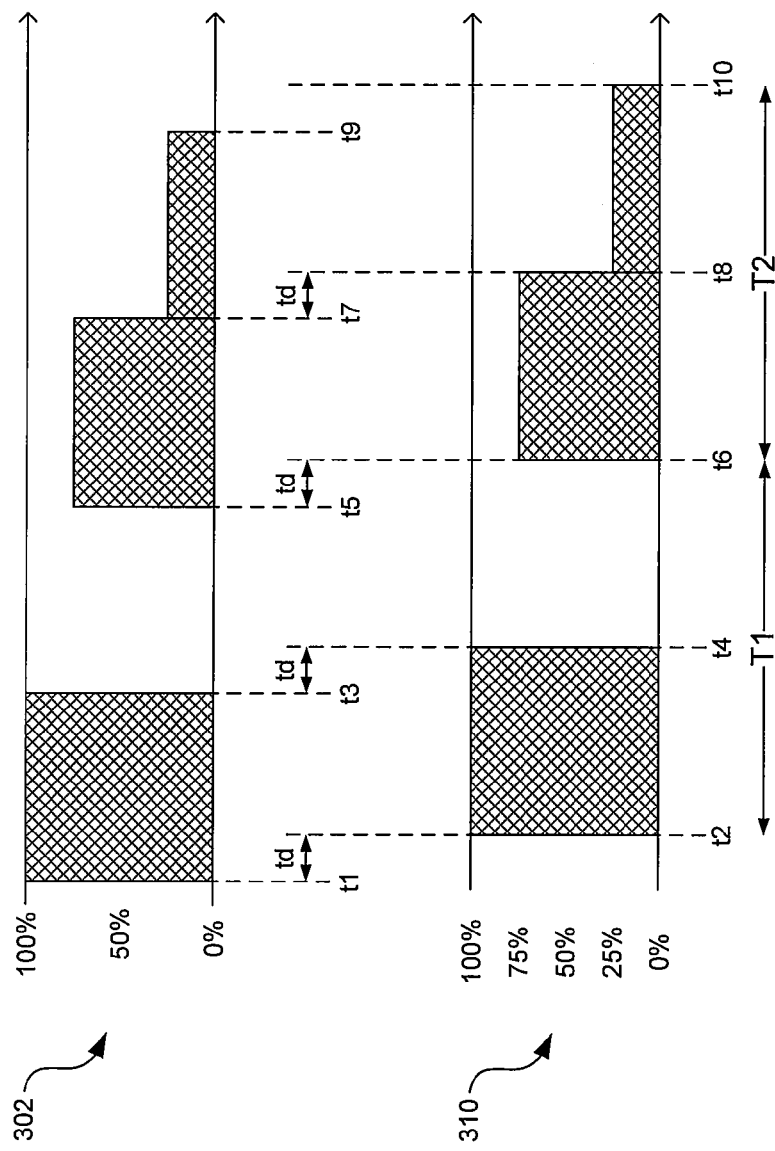
FIG. 3A is a diagram illustrating configuring a network node based on cycling of a data rate on a network link, in accordance with an embodiment of the invention.

FIG. 3A is a diagram illustrating configuring a network node based on cycling of a data rate on a network link, in accordance with an embodiment of the invention. Referring to FIG. 3A, graphs 302 and 310 depict activity on the link 112 and in the node 200, respectively, during an exemplary time period comprising time intervals T1 and T2. In this regard, the graph 302 illustrates an exemplary embodiment of the invention where the link 112 may cycle between a maximum data rate and zero date for a time interval T1 and between 75% and 25% of the maximum data rate for a time interval T2. However, in various other embodiments of the invention, the data rates on the link 112 and/or the number of time intervals during which a data rate is utilized may vary. In this regard, a variety of configurations of the node 200 may be utilized to best match data processing capabilities of the node 200 to a corresponding variety of data rates at which data may be communicated over the link 112.

At time instant t1, the link may transition to a maximum data rate. Accordingly, the node 200 may detect the new data rate on the link 112 and at time instant t2 may transition to a high(er) power configuration to handle the high data rate at which data may be transmitted and/or received via the link 112. In this regard, the delay, td, between time instants t1 and t2 may be due, for example, to finite time required for the node 200 to detect the new data rate and the time required for various components of the node 200 to be configured.

At time instant t3, the link 112 may transition to a zero data rate. Accordingly, the node 200 may detect the new data rate on the link 112. At time instant t4, the link may transition to a low(er) power configuration which may reduce power consumption when there may be little or no data communicated over the link 112. In this regard, the delay, td, between time instants t3 and t4 may be due, for example, to finite time required for the node 200 to detect the new data rate and the time required for various components of the node 200 to be configured.

At time instant t5, the link may transition to 75% of its maximum data rate. Accordingly, the node 200 may detect the new data rate on the link 112 and at time instant t6 may transition back to a high(er) power configuration. In this regard, the configuration of the node 200 from time instants t6 to t8 may enable higher power consumption than the "deep sleep" configuration but operation may utilize lower power than the configuration utilized from time instants t2 to t4.

At time instant t7, the link 112 may transition to 25% of the maximum data rate. Accordingly, the node 200 may detect the new data rate on the link 112 and at time instant t8 may transition to a low(er) power configuration which may reduce power consumption when there may be less data communicated over the link 112. In this regard, the delay, td, between time instants t7 and t8 may be due, for example, to finite time required for the node 200 to detect the new data rate and the time required for various components of the node 200 to be configured.

At time instant t9, the link 112 may transition to another data rate and after a short delay the node 200 transition to a corresponding configuration. In this manner, the node 200 may indefinitely be configured in response to a duty cycling of the data rate of the link 112.

Figure 3B:
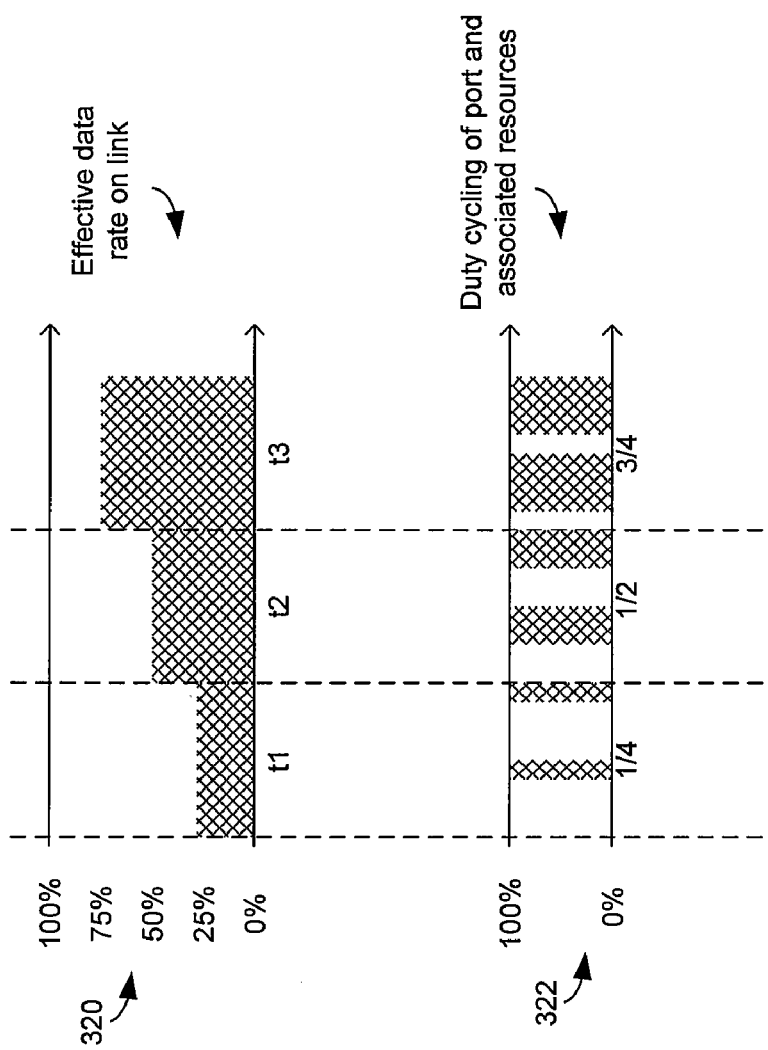
FIG. 3B is a diagram illustrating duty cycling portions of a network node between zero data processing capacity and a maximum data processing capacity, in accordance with an embodiment of the invention.

FIG. 3B is a diagram illustrating duty cycling portions of a network node between zero data processing capacity and a maximum data processing capacity, in accordance with an embodiment of the invention. Referring to FIG. 3B, there is shown a graph 320 depicting an effective data rate of a network link and a graph 322 depicting duty cycling of resources in a network node communicatively coupled to the link characterized by graph 320. Although FIG. 3B depicts the node being duty cycled between a series comprising only two configurations, the invention is not limited in this regard and the node may be duty cycled between three or more configurations.

During the exemplary time interval t1, data may be communicated over the link at 25% of the maximum data rate supported by the link. Accordingly, various components and/or resources in the node associated with the link may be configured to handle 0% of the maximum data rate ("deep sleep") of the link for 75% of time interval t1 and may be configured to handle 100% of the maximum data rate of the link for 25% of time interval t1.

During the exemplary time interval t2, data may be communicated over the link at 50% of the maximum data rate supported by the link. Accordingly, various components and/or resources in the node associated with the link may be configured to handle 0% of the maximum data rate ("deep sleep") of the link for 50% of time interval t2 and may be configured to handle 100% of the maximum data rate of the link for 50% of time interval t2.

During the exemplary time interval t3, data may be communicated over the link at 75% of the maximum data rate supported by the link. Accordingly, various components and/or resources in the node associated with the link may be configured to handle 0% of the maximum data rate ("deep sleep") of the link for 25% of time interval t3 and may be configured to handle 100% of the maximum data rate of the link for 75% of time interval t3.

Figure 3C:
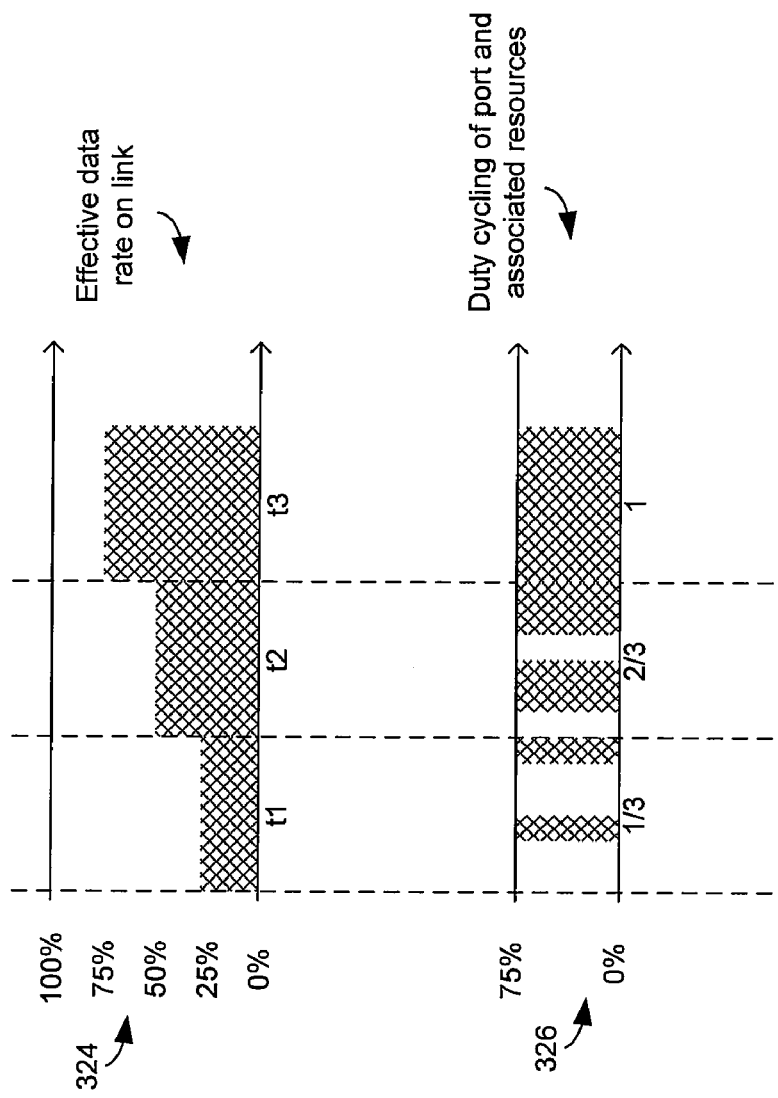
FIG. 3C is a diagram illustrating duty cycling portions of a network node between zero data processing capacity and an intermediate data processing capacity, in accordance with an embodiment of the invention.

FIG. 3C is a diagram illustrating duty cycling portions of a network node between zero data processing capacity and an intermediate data processing capacity, in accordance with an embodiment of the invention. Referring to FIG. 3C, there is shown a graph 324 depicting an effective data rate of a network link and a graph 326 depicting a duty cycling of resources in a network node communicatively coupled to the link characterized by graph 324. Although FIG. 3C depicts the node being duty cycled between a series comprising only two configurations, the invention is not limited in this regard and the node may be duty cycled between three or more configurations.

The intermediate data processing capacity may be determined based on the maximum rate, or maximum expected rate, at which data may be generated by nodes communicated over the link. In the exemplary embodiment of the invention disclosed with respect to FIG. 3C, the maximum rate at which data may be communicated over the link may be 75%.

During the exemplary time interval t1, data may be communicated over the link at 25% of the maximum data rate supported by the link. Accordingly, various components and/or resources in the node associated with the link may be configured to handle 0% of the maximum data rate ("deep sleep") of the link for 66⅔% of time interval t1 and may be configured to handle 75% of the maximum data rate of the link for 33⅓% of time interval t1.

During the exemplary time interval t2, data may be communicated over the link at 50% of the maximum data rate supported by the link. Accordingly, various components and/or resources in the node associated with the link 112 may be configured to handle 0% of the maximum data rate ("deep sleep") of the link for 33⅓% of time interval t2 and may be configured to handle 75% of the maximum data rate of the link for 66⅔% of time interval t2.

During the exemplary time interval t3, data may be communicated over the link at 75% of the maximum data rate supported by the link. Accordingly, various components and/or resources in the node associated with the link 112 may be configured to handle 75% of the maximum data rate of the link for the duration of time interval t3.

Figure 3D:
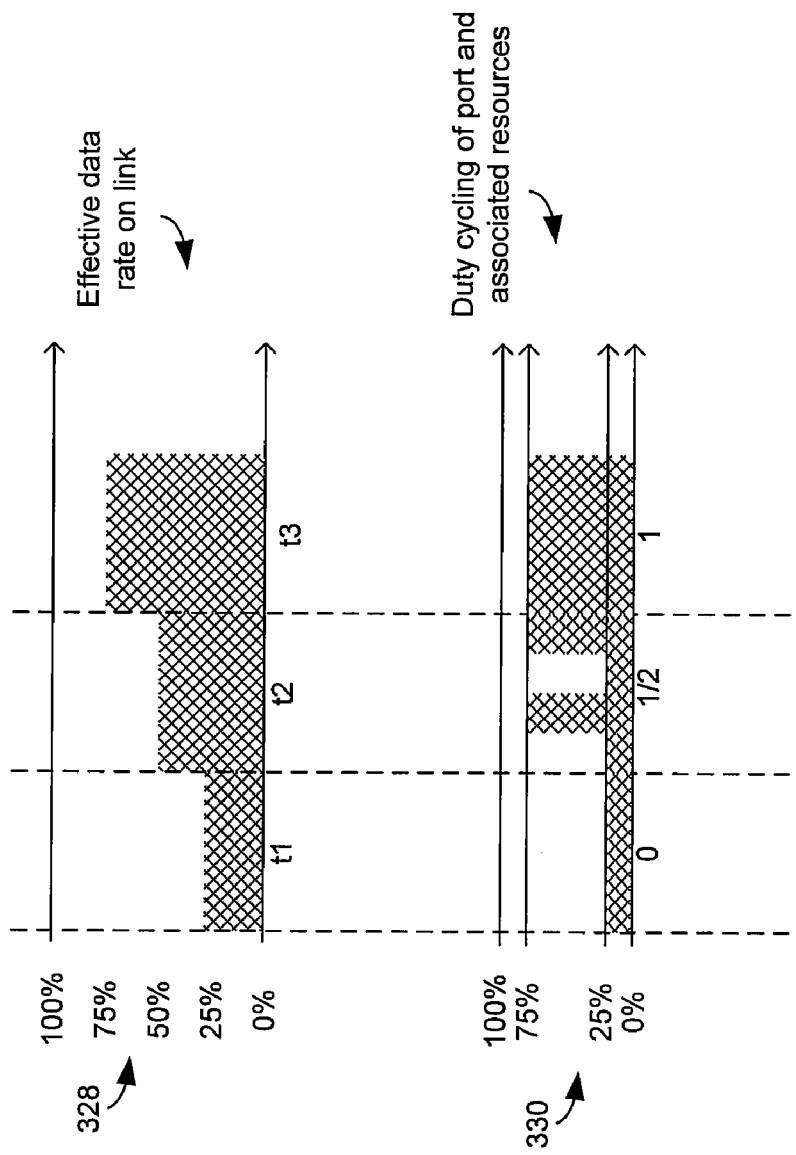
FIG. 3D is a diagram illustrating duty cycling portions of a network node between a first intermediate data processing capacity and a second intermediate data processing capacity, in accordance with an embodiment of the invention.

FIG. 3D is a diagram illustrating duty cycling portions of a network node between a first intermediate data processing capacity and a second intermediate data processing capacity, in accordance with an embodiment of the invention. Referring to FIG. 3D, there is shown a graph 326 depicting an effective data rate of a network link and a graph 328 depicting a duty cycling of resources in a network node communicatively coupled to the link characterized by graph 326. Although FIG. 3D depicts the node being duty cycled between a series comprising only two configurations, the invention is not limited in this regard and the node may be duty cycled between three or more configurations.

The first intermediate data rate may be determined based on the minimum rate, or minimum expected rate, at which data may be communicated over the link. In the exemplary embodiment of the invention depicted, the minimum rate at which data may be communicated over the link may be 25%. Similarly, the second intermediate data rate may be determined based on the maximum rate, or maximum expected rate, at which data may be communicated over the link. In the exemplary embodiment of the invention depicted, the maximum rate at which data may be communicated over the link may be 75%.

During the exemplary time interval t1, data may be communicated over the link at 25% of the maximum data rate supported by the link. Accordingly, various components and/or resources in the node associated with the link may be configured to handle 25% of the maximum data for the duration of time interval t1.

During the exemplary time interval t2, data may be communicated over the link at 50% of the maximum data rate supported by the link. Accordingly, various components and/or resources in the node associated with the link may be configured to handle 25% of the maximum data rate of the link for 50% of time interval t2 and may be configured to handle 75% of the maximum data rate of the link for 50% of time interval t2.

During the exemplary time interval t3, data may be communicated over the link at 75% of the maximum data rate supported by the link. Accordingly, various components and/or resources in the node associated with the link may be configured to handle 75% of the maximum data rate of the link for 50% of time interval t3.

Figure 3E:
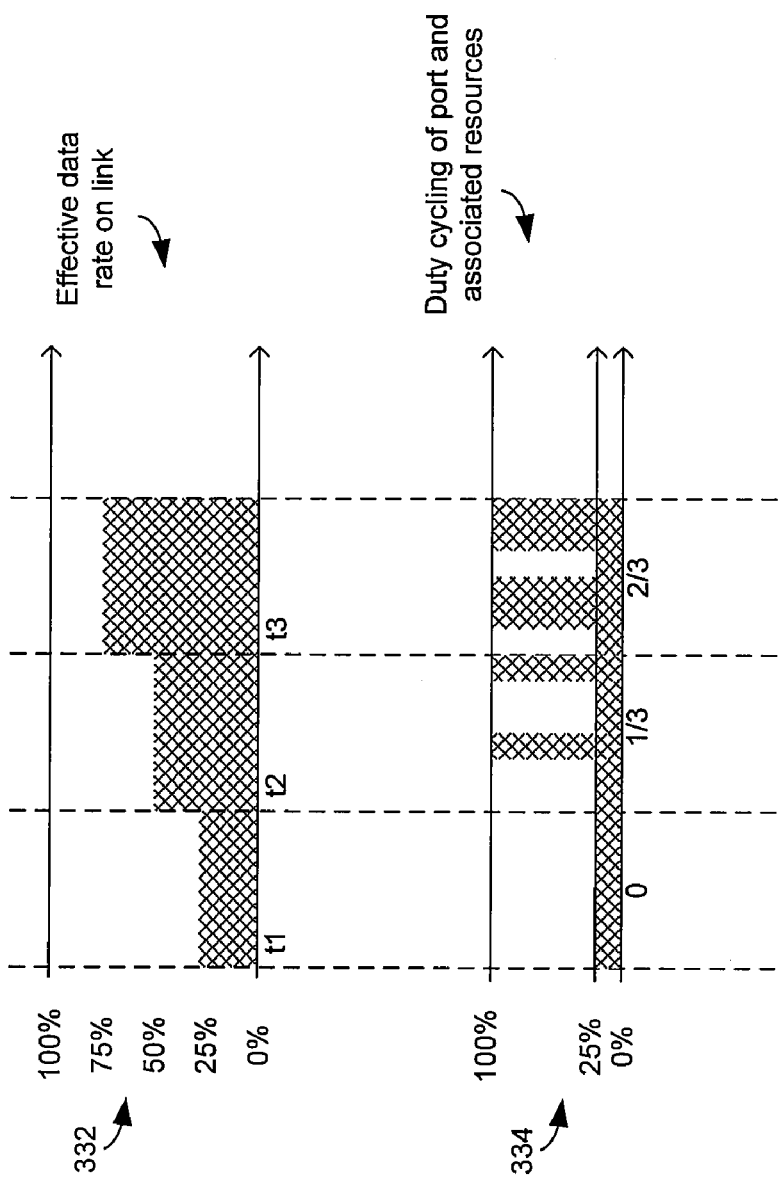
FIG. 3E is a diagram illustrating duty cycling portions of a network node between an intermediate data processing capacity and a maximum data processing capacity, in accordance with an embodiment of the invention.

FIG. 3E is a diagram illustrating duty cycling portions of a network node between an intermediate data processing capacity and a maximum data processing capacity, in accordance with an embodiment of the invention. Referring to FIG. 3E, there is shown a graph 332 depicting an effective data rate of a network link and a graph 334 depicting a duty cycling of resources in a network node communicatively coupled to the link characterized by graph 332. depicts the node being duty cycled between a series comprising only two configurations, the invention is not limited in this regard and the node may be duty cycled between three or more configurations.

The intermediate data rate may be determined based on the minimum rate, or minimum expected rate, at which data may be communicated over the link. In the exemplary embodiment of the invention depicted, the minimum rate at which data may be generated for communication over the link may be 25%.

During the exemplary time interval t1, data may be communicated over the link at 25% of the maximum data rate supported by the link. Accordingly, various components and/or resources in the node associated with the link may be configured to handle 25% of the maximum data for the duration of time interval t1.

During the exemplary time interval t2, data may be communicated over the link at 50% of the maximum data rate supported by the link. Accordingly, various components and/or resources in the node associated with the link may be configured to handle 25% of the maximum data rate of the link for 66⅔% of time interval t2 and may be configured to handle 100% of the maximum data rate of the link for 33⅓% of time interval t2.

During the exemplary time interval t3, data may be communicated over the link at 75% of the maximum data rate supported by the link. Accordingly, various components and/or resources in the node associated with the link may be configured to handle 25% of the maximum data rate of the link for 33⅓% of time interval t2 and may be configured to handle 100% of the maximum data rate of the link for 66⅔% of time interval t2.

Figure 4:
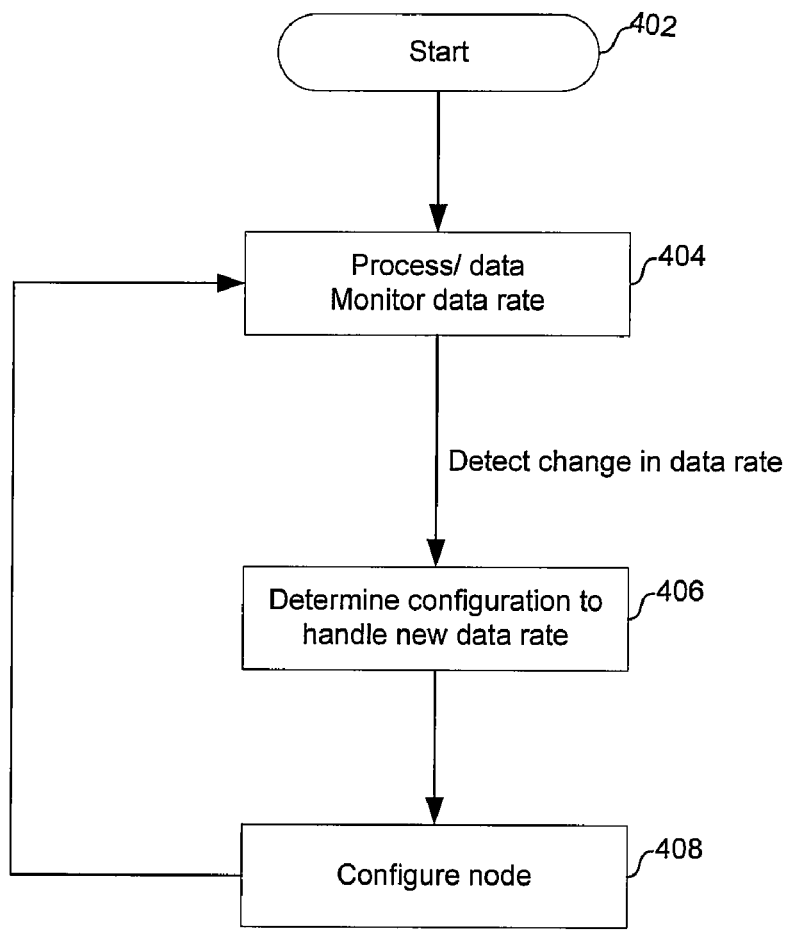
FIG. 4 is a flow chart illustrating exemplary steps for duty cycling data processing capabilities in a network node communicatively coupled to a network link with variable data rate, in accordance with an embodiment of the invention.

FIG. 4 is a flow chart illustrating exemplary steps for duty cycling data processing capabilities in a network node communicatively coupled to a network link with variable data rate, in accordance with an embodiment of the invention. The exemplary steps are described with reference to the exemplary network 100 described with respect to FIG. 1. Referring to FIG. 4, subsequent to start step 402 the exemplary steps may advance to step 404. In step 404, the nodes 102 and 104 may be processing data at a rate corresponding to a data rate of the link 112. Accordingly, when a new data rate on the link 112 is detected, the exemplary steps may advance to step 406.

In step 406, one or more configurations of components and/or resources in the node(s) 102 and/or 104 may be determined best meet the new data rate on the link 112. In this regard, it may be determined which components of the node(s) 102 and/or 104 should be (re)configured and/or when those components should be re-configured in order to best match the processing capabilities of the node 102 and/or 104 to the new data rate. Subsequent to step 406, the exemplary steps may advance to step 408

In step 408, the configuration determined in step 406 may be implemented. In this regard, in order to prevent lost and/or corrupted data, the transition to a new configuration may need to be coordinated between the nodes 102 and 104. Accordingly, at a determined time instant, the new configuration may be put into place. Subsequent to step 408, the exemplary steps may return to step 404 and operate utilizing the new duty cycling scheme until another change in data rate may be detected on the link 112.

Exemplary aspects of a method and system for duty cycling a network port based on duty cycling of a link communicatively coupled to the port are provided. In this regard, in a network node 200 communicatively coupled to a network link 112 which operates at a plurality of data rates, one or more components of said network node 200 may be cycled through a series of configurations. The processing capacity and/or duration of each configuration may be based on the plurality of data rates on the network link 112. The one or more components may be powered down and/or slowed down in one or more of the configurations. Power consumed by the node 200 in a first configuration may be less than power consumed by the node 200 in a second configuration. Additionally or alternatively, data processed by the node 200 in a first configuration may be less than data processed by the node in a second configuration. Exemplary components of the node may comprise one or more hybrids 226, transmitters 214, receivers 220, processors 228, and/or memory elements 216. The components may be cycled through the series of configurations during each of a series of time intervals. A first series of configurations may be utilized for a portion of the one or more components that are utilized for receiving data and a second series of configurations may be utilized for a portion of the one or more components utilized for transmitting data. The series of configurations may be determined based on one or more of a type of data communicated over said network link 112 and an application running on said network node 200.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for duty cycling a network port based on duty cycling of a link communicatively coupled to the port.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
in a network node communicatively coupled to a network link which operates at a plurality of data rates:
determining an effective rate at which data is received by said network node via said network link during a first time interval, wherein said effective rate at which data is received is constant during said first time interval;
duty cycling based on powering up or powering down, at least a portion of a first plurality of components of said network device through a first series of power configurations that is determined in response to said determined effective rate at which said data is received during said first time interval;
determining an effective rate at which data is transmitted by said network node via said network link during a second time interval, wherein said effective rate at which data is transmitted is constant during said second time interval; and
duty cycling based on said powering up or said powering down, at least a portion of a second plurality of components of said network device through a second series of power configurations that is determined in response to said determined effective rate at which said data is transmitted during said second time interval.

2. The method according to claim 1, wherein:
said at least a portion of said first plurality of components of said network node are sped up and/or slowed down while configured in one or more power configurations of said first series of power configurations; and
said at least a portion of said second plurality of components of said network node are sped up and/or slowed down while configured in one or more power configurations of said second series of power configurations.

3. The method according to claim 1, wherein:
power consumed by said first plurality of components of said network node while configured in a first configuration of said first series of power configurations is less than power consumed by said first plurality of components of said network node while configured in a second configuration of said first series of power configurations; and
power consumed by said second plurality of components of said network node while configured in a first configuration of said second series of power configurations is less than power consumed by said second plurality of components of said network node while configured in a second configuration of said second series of power configurations.

4. The method according to claim 1, wherein:
data processed by said first plurality of components of said network node while configured in a first configuration of said first series of power configurations is less than data processed by said first plurality of components of said network node while configured in a second configuration of said first series of power configurations; and
data processed by said second plurality of components of said network node while configured in a first configuration of said second series of power configurations is less than data processed by said second plurality of components of said network node while configured in a second configuration of said second series of power configurations.

5. The method according to claim 1, wherein one or both of said first plurality of components and said second plurality of components comprises one or more hybrids, transmitters, receivers, processors, and/or memory elements.

6. The method according to claim 1, comprising cycling said first plurality of components of said network node through said first series of said power configurations during each of a series of time intervals.

7. The method according to claim 1, comprising cycling said second plurality of components through said second series of said power configurations during each of a series of time intervals.

8. The method according to claim 1, comprising:
determining said first series of said power configurations and/or said second series of said power configurations based on one or more of a type of data communicated over said network link, an application running on said network node, and power consumption of said node.

9. A non-transitory machine-readable storage having stored thereon, a computer program having at least one code section for networking, the at least one code section being executable by a machine for causing the machine to perform steps comprising:
in a network node communicatively coupled to a network link which operates at a plurality of data rates:
determining an effective rate at which data is received by said network node via said network link during a first time interval, wherein said effective rate at which data is received is constant during said first time interval;
duty cycling based on powering up or powering down, at least a portion of a first plurality of components of said network device through a first series of power configurations that is determined in response to said determined effective rate at which said data is received during said first time interval;
determining an effective rate at which data is transmitted by said network node via said network link during a second time interval, wherein said effective rate at which data is transmitted is constant during said second time interval; and
duty cycling based on said powering up or said powering down, at least a portion of a second plurality of components of said network device through a second series of power configurations that is determined in response to said determined effective rate at which said data is transmitted during said second time interval.

10. The non-transitory machine-readable storage according to claim 9, wherein:
said at least a portion of said first plurality of components of said network node are sped up and/or slowed down while configured in one or more power configurations of said first series of power configurations; and
said at least a portion of said second plurality of components of said network node are sped up and/or slowed down while configured in one or more power configurations of said second series of power configurations.

11. The non-transitory machine-readable storage according to claim 9, wherein:
power consumed by said first plurality of components of said network node while configured in a first configuration of said first series of power configurations is less than power consumed by said first plurality of components of said network node while configured in a second configuration of said first series of power configurations; and power consumed by said second plurality of components of said network node while configured in a first configuration of said second series of power configurations is less than power consumed by said second plurality of components of said network node while configured in a second configuration of said second series of power configurations.

12. The non-transitory machine-readable storage according to claim 9, wherein:

data processed by said first plurality of components of said network node while configured in a first configuration of said first series of power configurations is less than data processed by said first plurality of components of said network node while configured in a second configuration of said first series of power configurations; and data processed by said second plurality of components of said network node in a first configuration of said second series of power configurations is less than data processed by said second plurality of components of said network node in a second configuration of said second series of power configurations.

13. The non-transitory machine-readable storage according to claim 9, wherein one or both of said first plurality of components and said second plurality of components comprises one or more hybrids, transmitters, receivers, processors, and/or memory elements.

14. The non-transitory machine-readable storage according to claim 9, wherein said at least one code section comprises code for cycling said first plurality of components of said network node through said first series of said power configurations during each of a series of time intervals.

15. The non-transitory machine-readable storage according to claim 9, wherein said at least one code section comprises code for cycling said second plurality of components through said second series of said power configurations during each of a series of time intervals.

16. The non-transitory machine-readable storage according to claim 9, wherein said at least one code section comprises code for determining said first series of power configurations and/or said second series of said power configurations based on one or more of a type of data communicated over said network, an application running on said network node, and power consumption of said node.

17. A system for networking, the system comprising:

one or more circuits and/or processors in a network node communicatively coupled to a network link which operates at a plurality of data rates, wherein, said one or more circuits and/or processors are operable to;

determine an effective rate at which data is received by said network node via said network link during a first time interval, wherein said effective rate at which data is received is constant during said first time interval;

duty cycle based on powering up or powering down, at least a part of a first portion of said one or more circuits and/or processors through a first series of power configurations that is determined in response to said determined effective rate at which said data is received during said first time interval;

determine an effective rate at which data is transmitted by said network via said network link during a second time interval, wherein said effective rate at which data is transmitted is constant during said second time interval; and duty cycle based on powering up or powering down, at least a part of a second portion of said one or more circuits and/or processors through a second series of power configurations that is determined in response to said determined effective rate at which said data is transmitted during said second time interval.

18. The system according to claim 17, wherein:

said at least part of said first portion of said one or more circuits and/or processors are sped up and/or slowed down while configured in one or more power configurations of said first series of power configurations; and said at least part of said second portion of said one or more circuits and/or processors are sped up and/or slowed down while configured in one or more power configurations of said second series of power configurations.

19. The system according to claim 17, wherein:

power consumed by said first portion of said one or more circuits and/or processors in a first configuration of said first series of power configurations is less than power consumed by said portion of said circuits and/or processors in a second configuration of said first series of power configurations; and power consumed by said second portion of said one or more circuits and/or processors in a first configuration of said second series of power configurations is less than power consumed by said second portion of said circuits and/or processors in a second configuration of said second series of power configurations.

20. The system according to claim 17, wherein:

data processed by said first portion of said one or more circuits and/or processors while configured in a first configuration of said first series of power configurations is less than data processed by said one or more circuits and/or processors while configured in a second of said power configurations.

21. The system according to claim 17, wherein said one or more circuits and/or processors comprises one or more hybrids, transmitters, receivers, processors, and/or memory elements.

22. The system according to claim 17, wherein said first portion of said one or more circuits and/or processors cycle through said first series of said power configurations during each of a series of time intervals.

23. The system according to claim 17, wherein said second portion of said one or more circuits and/or processors cycles through said second series of said power configurations during each of a series of time intervals.

24. The system according to claim 17, wherein said first series of said power configurations and/or said second series of said power configurations is based on one or more of a type of data communicated over said network, an application running on said network node, and power consumption of said node.

* * * * *